United States Patent
Wimbert et al.

(10) Patent No.: US 11,987,198 B2
(45) Date of Patent: May 21, 2024

(54) VEHICLE AIRBAG COVER ASSEMBLY

(71) Applicant: Eissmann Automotive Deutschland GmbH, Bad Urach (DE)

(72) Inventors: Frank Wimbert, Owen (DE); Norman Eitel, Eningen (DE); Hannes Böhm, Reutlingen (DE)

(73) Assignee: Eissmann Automotive Deutschland GmbH, Bad Urach (DE)

( * ) Notice: Subject to any disclaimer, the term of this patent is extended or adjusted under 35 U.S.C. 154(b) by 0 days.

(21) Appl. No.: 18/057,895

(22) Filed: Nov. 22, 2022

(65) Prior Publication Data

US 2023/0158994 A1  May 25, 2023

(30) Foreign Application Priority Data

Nov. 22, 2021 (DE) ............ 10 2021 213 111.5

(51) Int. Cl.
*B60R 21/215* (2011.01)
*B60Q 3/14* (2017.01)

(52) U.S. Cl.
CPC .......... *B60R 21/215* (2013.01); *B60Q 3/14* (2017.02)

(58) Field of Classification Search
CPC ................. B60Q 3/14; B60R 21/215
See application file for complete search history.

(56) References Cited

U.S. PATENT DOCUMENTS

| | | | | |
|---|---|---|---|---|
| 5,549,323 | A * | 8/1996 | Davis .............. | B60R 21/215 280/732 |
| 7,520,528 | B2 * | 4/2009 | Nakamura ........ | B60Q 5/003 280/731 |
| 7,866,858 | B2 * | 1/2011 | Hirzmann ........ | G09F 21/04 362/487 |
| 11,305,718 | B2 | 4/2022 | Ko et al. | |
| 2015/0375677 | A1 * | 12/2015 | Salter ............... | F21V 9/32 362/510 |
| 2019/0322211 | A1 | 10/2019 | Kim et al. | |

FOREIGN PATENT DOCUMENTS

| | | |
|---|---|---|
| CN | 111332218 A | 6/2020 |
| DE | 10 2007 010 328 A1 | 4/2008 |
| DE | 10 2020 133 374 A1 | 3/2022 |

OTHER PUBLICATIONS

German Office Action issued for corresponding German Patent Application No. DE 10 2021 213 111.5, dated Aug. 2, 2023.

* cited by examiner

*Primary Examiner* — Robert J May
(74) *Attorney, Agent, or Firm* — Renner, Otto, Boisselle & Sklar, LLP

(57) ABSTRACT

A vehicle airbag cover assembly, comprises a cover element and an electronic module comprising a light emitting element. The module is embedded in an at least partially transparent plastic material thus forming an integrated electronic module. The integrated module is arranged at the cover element such that an illumination from the at least one light emitting element is visible for a passenger when the airbag cover assembly is installed in a vehicle.

17 Claims, 3 Drawing Sheets

VEHICLE AIRBAG COVER ASSEMBLY

This application claims priority of German Application No. 10 2021 213 111.5, filed Nov. 22, 2021, which is hereby incorporated herein by reference in its entirety.

1. FIELD OF THE INVENTION

The present invention relates to a vehicle airbag cover assembly, that allows the integration of light-emitting features to provide a passenger in the vehicle with informative and/or aesthetic illuminations.

2. TECHNICAL BACKGROUND

An airbag is a safety device for passenger vehicles utilizing an inflatable bag that deploys in case of an accident. The main components of any airbag are the flexible fabric bag, an inflation module and an airbag cover, which covers all these components in the interior of the vehicle. For a safe and reliable deployment of the airbag, the cover is usually provided with predetermined breaking points or lines that allow a rupturing of the cover element upon deployment of the airbag. Airbags are used in various locations inside of the vehicle, like for example in the steering wheel, in front of the passenger seat, in the A-pillar of the vehicle etc. For safety reasons it is very important that the airbag cover upon deployment of the airbag does not produce any dangerous debris, like splintered elements.

In modern vehicles, the use of illumination inside of the passenger compartment serves to increase the comfort as well as the safety in form of for example safety warnings. In this context it would be desirable to also provide airbag covers with such illumination features for aesthetic and safety purposes. This is in particular true for the driver airbag inside of the steering wheel, as this airbag is in direct view of the driver. By illuminating for example a logo of the vehicle manufacturer, which is typically centrally located on the cover of the driver airbag, a particularly pleasant effect can be created and the illumination features would be in the perfect position to be readily recognized by the driver.

However, in the past it was not possible to integrate such an illumination feature in an airbag, respectively airbag cover, as the necessary electronic components must be arranged in the deployment zone of the airbag, so that upon deployment of the airbag these components are a safety risk. For this reason, up to now, illuminations of airbag covers, although highly desirable for comfort and safety reasons, are not available.

It is therefore one object of the present invention to overcome the disadvantages of the art and to provide an improved airbag cover assembly with integrated illumination features. Other objects and advantages of the invention will become apparent on reading the following description.

The objects are solved by an airbag cover assembly in accordance with claim 1 and a vehicle comprising such an assembly in accordance with claim 15.

3. DETAILED DESCRIPTION OF THE INVENTION

Preferably, the above problems are solved by a vehicle airbag cover assembly, comprising a cover element and an electronic module comprising a light emitting element. The module is embedded in a at least partially transparent plastic material, so that the module and the plastic material form an integrated electronic module. The integrated electronic module is arranged at the cover element such that an illumination from the at least one light emitting element is visible for a passenger when the airbag cover assembly is installed in a vehicle.

By embedding the electronic module in plastic material, the various components of the module will not splinter upon deployment of the airbag. In other words, since the electronic module is completely encapsulated by the plastic material the module will keep its integrity and does not break, so that no sharp or dangerous objects will fly into the passenger compartment of the vehicle in case of an accident. Most preferably, the plastic material is injection molded over the module and preferably covers all components of the module safely and completely.

Since the plastic material is at least partially transparent, the light emitted from the module is still visible and it is thereby possible to realize comfort and safety features, which are in direct view of for example the driver of the vehicle, when for example used in connection with the driver airbag. The illumination can for example be used to warn the driver of an imminent collision by using a suitable warning light.

In a preferred embodiment, the integrated electronic module, and in particular the plastic material thereof, forms a part of the surface of the cover element. This can be achieved by various means. For example, the cover element may comprise openings or apertures and the plastic material is shaped such that portions of the plastic material protrude into these openings, respectively fill these openings, so that the outer surface of the cover element is essentially flush. As the skilled person will recognize, this will lead to a very good visibility of any illumination.

The airbag cover may be provided with at least partially transparent portions and/or openings and the integrated module may be arranged on the rear side of the airbag cover, to at least partially cover the transparent portions and/or openings. In this way, illumination deriving from the module can shine through these transparent portions, so that the illumination is visible for the passengers of the vehicle. The rear side of the airbag cover is the side which in installed condition faces away from the passenger compartment. This contrasts with the front side of the airbag cover, which is the surface of the cover facing the interior of the passenger compartment.

Preferably, the integrated electronic module is configured to illuminate a logo of the vehicle brand (like a logo of the vehicle manufacturer or a specific logo of the vehicle model). In passenger vehicles the logo of the vehicle brand/model is typically arranged centrally on the cover of the driver's airbag. This is often the only place in the interior of the passenger vehicle which shows a logo of the manufacturer and is very important from a marketing viewpoint. Further, this central location is readily visible for the driver of the vehicle and therefore an ideal location for placement of additional safety features, such as the abovementioned use of light signals as warning signals for the driver. In the prior art, it was not possible to use this central location for such features, as the deployment of the airbag would almost inevitably break off parts of the necessary electronics, which then become dangerous shrapnel flying through the passenger compartment. With the present invention, this problem is overcome by the safe embedding of the necessary electronic components in an integrated electronic module.

In some embodiments, a logo may be integrated with the cover element, and/or a logo may be integrated with the integrated electronic module, and/or a logo may be provided in form of a separate component that is attached to the front surface of the cover element. To achieve an illuminated car manufacturer logo, the same may for example be integrated with the cover element, in which case naturally at least some parts of the logo itself, or parts of the surrounding material around the logo, must be transparent to the light emitted from the electronic module. Another possibility is to integrate the logo at least partially with the integrated electronic module itself, so that upon illumination by means of the light emitting elements, the logo becomes illuminated as well. Another option is to arrange the logo as a separate component at the front surface of the cover element, as it is currently typically done with non-illuminated logos on the covers of the driver's airbag. Obviously, also in this case some form of transparency must be provided either in the logo itself and/or the material surrounding the logo.

Preferably, the electronic module comprises a flexible substrate carrying the light emitting element. The flexible substrate preferably further comprises electrical tracks and/or circuits that may be printed onto the substrate, e.g. by means of electrically conductive inks. This allows for a facilitated mounting on for example the rear side of the cover element and it improves the overall safety of the components.

In some preferred embodiments, the surface of the embedding plastic material is at least partially covered with a foil or textile, which comprises transparent portions and essentially non-transparent portions. Such a foil or textile allows a very convenient way to realize various forms, shapes and symbols to be illuminated. For example, the foil or textile may be essentially non-transparent, and the transparent regions are in the form of the manufacturer's logo. Another option is to use an essentially transparent foil or textile and to print the non-transparent portions onto the foil or textile. This allows the use of a printing process to realize complex shapes in a fast, reliable and cost-effective manner.

In another preferred embodiment, the electronic module may comprise a flexible substrate carrying the light emitting element(s) and the embedding plastic material may comprise at its surface protruding portions that extend at least partially through openings in the cover element. The upper surface of the embedding plastic material is in this embodiment not flush but provided with protruding portions, that may for example have any shape, but are preferably formed to resemble a symbol, letters, graphical icons or similar. Most preferably, the protruding portions from at least part of a logo of the car manufacturer. The flexible substrate is provided with electrical tracks or circuits and may use a flexible plastic substrate for mounting the various electrical and electronical components. As materials for the substrate polyimide, PEEK or polyester films may be used. A flexible substrate offers additional safety advantages in case of an airbag deployment compared to a rigid printed circuit board.

The (preferably flexible) substrate may comprise light reflecting structures separate from the light emitting element(s) configured to direct light emitted from the light emitting element(s) essentially perpendicular to the plane of the substrate. The use of such light reflecting structures allows a more flexible arrangement of the light emitting elements and/or the directing of light emissions away from the substrate in basically all directions. It further allows to manufacture the module relatively flat, which is important given the limited space for mounting the module with the airbag cover. Yet still further, another advantage is that by using such light reflecting structures, which are relatively inexpensive compared to the light emitting elements themselves, it is possible to direct the light emitted by a single light emitting element into various directions, by for example redirecting the light. In this context it can be advantageous to arrange at least some of the light emitting elements(s) to emit light essentially parallel to the plane of the substrate. Preferably the cover element comprises at least one predetermined breaking point allowing a rupturing of the cover element upon deployment of the airbag. When provided with such a predetermined breaking point, it is recommended to arrange the integrated electronic module at a certain distance from said breaking point for additional safety.

As discussed above, the present invention offers advantages when used in connection with a driver's airbag. In other words when the cover assembly is a driver airbag cover assembly.

The plastic material may be injection-molded onto the electronic module. As the skilled person will understand, the plastic material embedding the electronic module should prevent or at least mitigate that upon deployment of the airbag parts of the electronic module break or splinter off and become dangerous missiles due to the force of the deploying airbag. By injection molding the plastic material a safe embedding can be achieved, such that the whole assembly of electronic components and plastic material is one robust integrated part and all elements thereof are inseparably encapsulated by the plastic material.

As a suitable plastic material one or more of the following materials may be chosen: thermoplastic materials in general, silicon, thermoplastic elastomers, polymers, polyethylenes, polystyrene, PMMA (Polymethylmethacrylate), Polycarbonate (PC), polyimide, rubber or rubbery material.

Preferably, the integrated electronic module has an essentially flat configuration with a thickness of 2 to 10 mm, preferably 2 to 8 mm, more preferably 2 to 7 mm and most preferably 2 to 5 mm. Thus, this assembly can be made really thin such that it fits into the limited space in an airbag assembly, as for example on the rear side of the cover element of the airbag.

The present invention also relates to a vehicle, in particular passenger vehicle, comprising an airbag cover assembly as disclosed above.

It is clear for the skilled person, that the above-described embodiments are not mutually exclusive. It is for example possible to provide the cover element with openings into which protrusions of the plastic material extend and at the same time to provide other portions of the cover element with transparent surfaces, so that the illumination effect is established partially by the protruding portions of the plastic material and partially by the transparent regions of the cover element. Similarly, the skilled person will understand that if it is for example desired to illuminate a logo of the vehicle manufacturer one can realize the logo partially by a protruding portion of the plastic material and partially by suitably designed transparent and non-transparent regions on the surfaces of the plastic material and/or the cover element.

4. SHORT DESCRIPTION OF THE FIGURES

In the following, exemplary embodiments of the invention are described with reference to the figures.

5. DETAILED DESCRIPTION OF PREFERRED EMBODIMENTS

Figure 1:
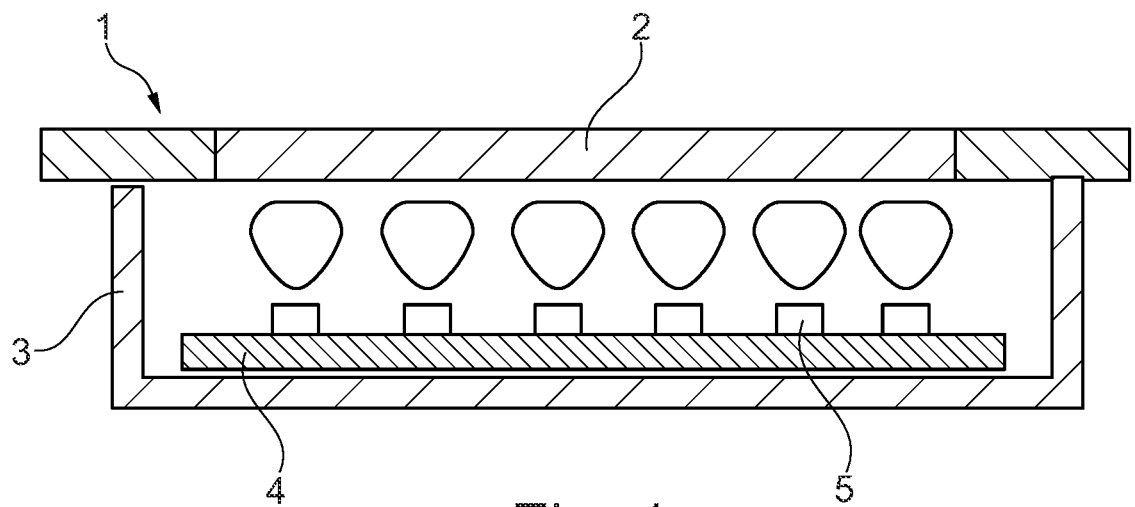
FIG. 1 shows an electronic component for illuminating symbols or surfaces according to the prior art.

FIG. 1 shows an electronic module 1 for illuminating surfaces or symbols or similar according to the prior art. The module comprises a housing 3 having a transparent cover 2. Inside of housing 3, a printed circuit board (PCB) 4 is arranged onto which a number of LEDs 5 is mounted. The LEDs 5 emit light which shines through the transparent cover 2. Such an assembly generally works well for a large number of applications, but it can hardly be used inside of an airbag assembly, as upon deployment of the airbag and the rupturing of the airbag cover, pieces of the module 1 may become loose, or break off, and will fly through the passenger compartment of the vehicle, potentially injuring passengers.

Figure 2:
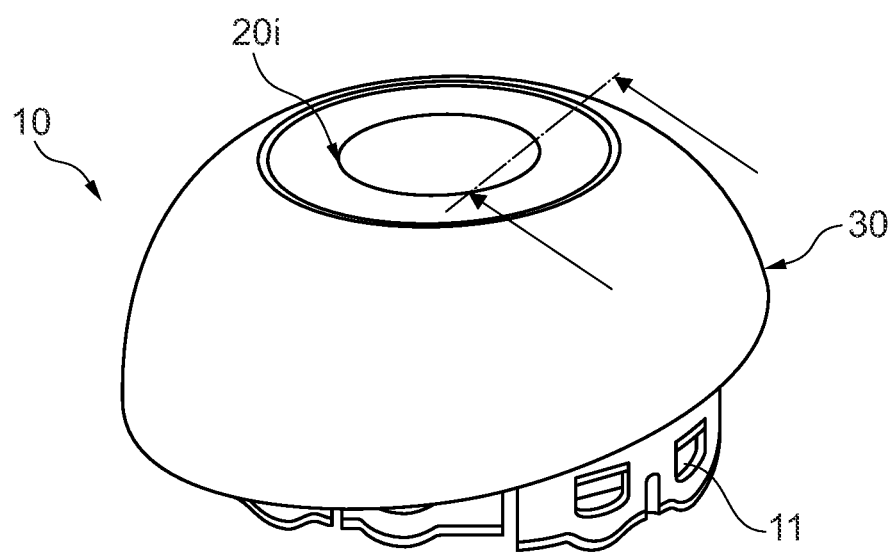
FIG. 2 shows an airbag cover assembly in accordance with the invention in a three-dimensional view.

FIG. 2 shows a vehicle airbag cover assembly 10 in accordance with the invention in a schematic three-dimensional view. The shown assembly 10 is for a driver airbag of the vehicle and comprises a cover element 30 and an integrated electronic module 20i. Reference sign 11 indicates mounting means, by means of which the cover assembly can be mounted to the steering wheel, respectively steering column of the vehicle. As one can take from FIG. 2, the module 20i forms a part of the surface of the cover element 30. To this end, the cover element 30 has an essentially circular opening or cut-out and the module 20i has a correspondingly shaped circular portion that fits into the opening. As will be described in more detail below, the portion of module 20i that forms part of the cover element 30 is at least partially transparent to visible light, such that illumination from a light-emitting element of the module 20i is visible for a passenger, when the airbag cover assembly 10 is installed in the vehicle.

Figure 3:
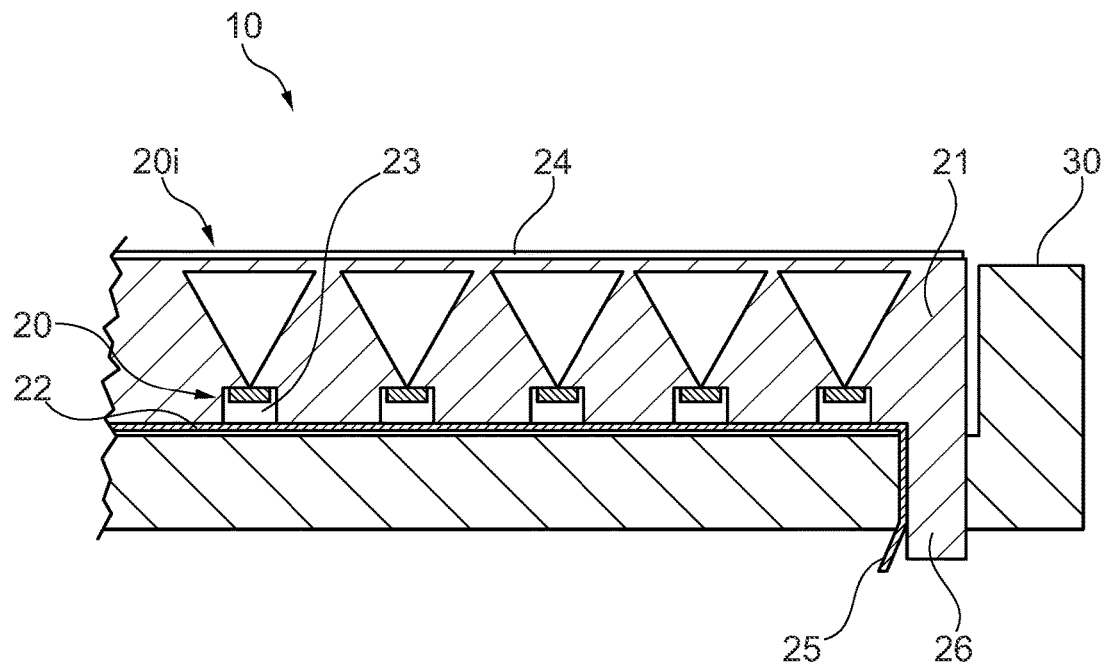
FIG. 3 shows an embodiment of an integrated electronic module according to the invention in a partially cut view.

FIG. 3 shows the airbag cover assembly 10 of FIG. 2 in a schematic, partially cut side view. The integrated electronic module 20i comprises an electronic module 20 having a number of LEDs 23, that are arranged on a flexible substrate 22. The substrate 22 is provided with electric conducts 25, to connect the module 20 with a power supply and control electronics of the vehicle. The module 20 with all its components, like LEDs 23 and substrate 22, is embedded in a translucent plastic material 21, thereby forming the integrated electronic module 20i. The plastic material 21 is preferably injection molded over substrate 22 and LEDs 23 for a complete and safe encapsulation of the various components of the module. The substrate 22 is further provided with electrical tracks and/or other electrical and electronic components (not shown).

As one can take from FIG. 3, the integrated module 20i is arranged at least partially on the front side of the cover element 30 and thus forms a part of the surface of the cover element. The cover element is provided with openings or apertures to allow a fixation of the module and for introducing the electrical conducts 25 of the substrate. The plastic material 21 has integrally formed mounting means 26 that fit into the apertures in the cover element 30. On top of the plastic material 21 a decorative foil 24 is arranged that may be provided with transparent and nontransparent portions so that upon illumination by the LEDs 23 a decorative pattern is illuminated. The decorative pattern may for example show a logo of the car manufacturer.

Figure 4:
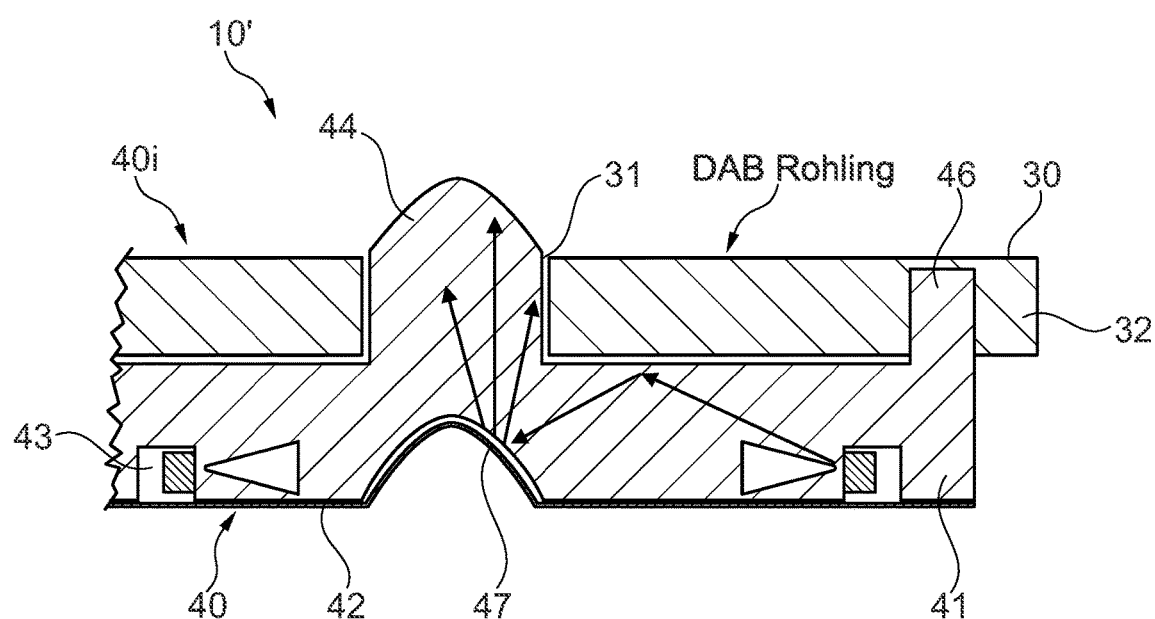
FIG. 4 shows another embodiment of an integrated electronic module according to the invention in a partially cut view.

FIG. 4 shows another embodiment of an airbag cover assembly 10'. In the embodiment of FIG. 4, the electronic module 40 is mounted on the rear side of the cover element 30. The module comprises a flexible substrate 42, onto which a number of LEDs 43 are mounted. The module 40 is embedded in plastic material 41 thus forming an integrated electronic module 40i. The LEDs 43 are arranged to emit light essentially parallel to the plane of the substrate 42. The light from the LEDs 43 is redirected essentially perpendicular to the plane of the substrate 42 by means of a light reflecting structure 47. The embedding plastic material 41 comprises at its outer surface protruding portions 44, that extend through openings 31 in the cover element 30. In the shown embodiment, the protrusions 44 protrude to some extent out of the openings 31 but may also be configured to be flush with the front surface of cover 30 or even extent only partially into the opening 31.

As with the other embodiments, the plastic material 41 is preferably injection molded to embed the various components of the electronic module, like for example the LEDs 43, substrate 42 and reflective structures 47. By arranging the LEDs 43 such that the light is emitted essentially parallel to the plane of the substrate 42 it is possible to create various illumination profiles and it is possible to save costs, as the reflective structures may be used to redirect light from a single LED into various directions, so that a single LED can be used to emit light in different directions. The reflective structure 47 is shown as a protrusion of the substrate but also different forms are possible. The reflective structure can also be a separate component, that is mounted to the otherwise flat substrate.

The protrusions 44 can be arranged in various shapes to represent for example symbols, numbers, letters, etc., or preferably a logo of the car manufacturer. One advantage of this embodiment is, that by means of the protrusions 44 not only a visual but also a haptic feature can be realized.

Figure 5:
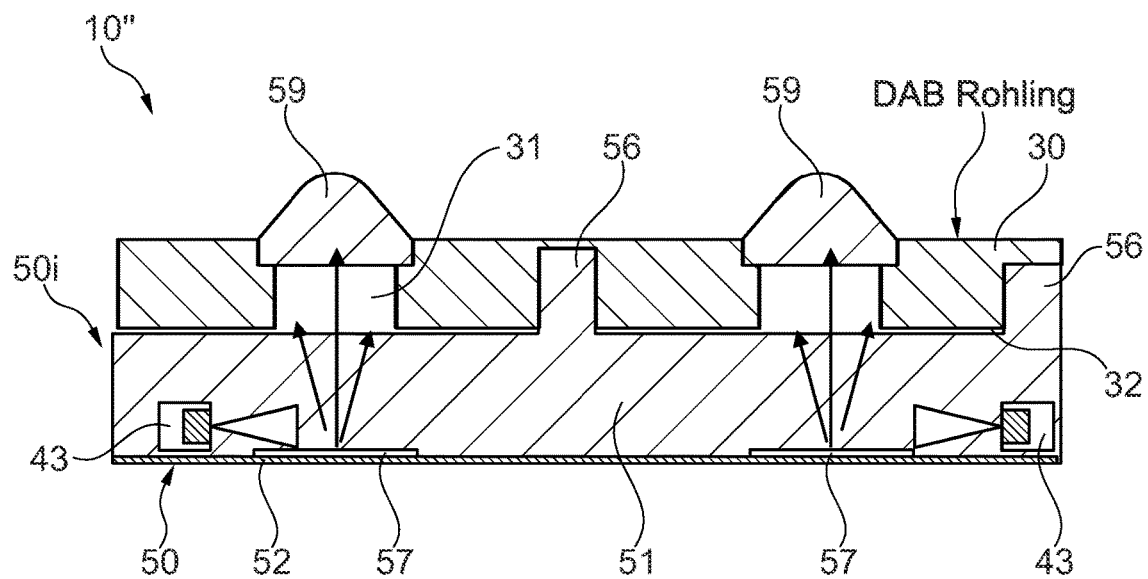
FIG. 5 shows yet another embodiment of an integrated electronic module according to the invention in a partially cut view.

FIG. 5 shows yet another embodiment of a vehicle airbag cover assembly 10". The integrated electronic module 50i is similar to the module of the embodiment of FIG. 4. A number of LEDs 53 is arranged to emit light essentially parallel to the plane of the flexible substrate 52. A number of reflective structures 57 are mounted on the surface of the substrate 52 to direct light away from the substrate surface in directions essentially towards openings 31 provided in the cover element 30. In the embodiment of FIG. 5, the module 50i is mounted on the rear side of the cover element 30, that means the surface facing away from the passenger compartment, when the airbag cover assembly is installed in a vehicle. Instead of protrusions that are integrally formed with the plastic material 51 of the module 50i, the front surface of the cover element 30 is provided with a separate component 59 that in the shown embodiment resembles a logo of the car manufacturer. This alternative allows more flexibility in shaping the separate component and it simplifies the manufacturing process of the integrated module 50i.

The embodiment of FIG. 5 further comprises mounting means 56 in the form of protrusions integrally formed with the plastic material 51. The mounting means 56 extend into corresponding apertures on the rear side of cover element 30.

Figure 6:
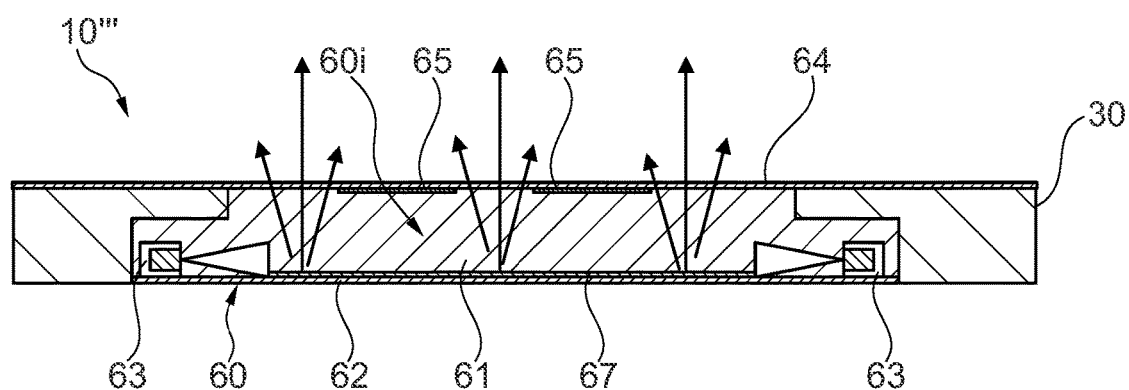
FIG. 6 shows a further embodiment of an integrated electronic module according to the invention.

FIG. 6 shows yet another embodiment of an airbag cover assembly 10'''. The electronic module 60 comprises a substrate 62 having several LEDs 63 mounted thereon as well as a reflective structure 67 in form of a reflective foil that is glued to the surface of the substrate. All the components of the electronic module 60 are encapsulated by plastic material 61 thus forming an integrated electronic module 60i. The integrated module is arranged in an opening of the cover element 30 and thus forms a part of the surface of the cover element. A decorative textile 64 is arranged on the top surface of the integrated module 60i covering the same as well as the surface of the cover element 30. On the rear side of the decorative textile some non-transparent portions 65 are printed, so that light emitted from the LEDs 63 is essentially only visible through those portions of the textile 64, that are not provided with printed portions 65. It is readily apparent for the skilled person, that this embodiment allows a great flexibility in designing the illuminated areas.

It should be understood that the invention is not limited to single embodiments described herein, but that the embodiments are only exemplary to facilitate understanding of the invention. It is in particular possible to combine the aspects of the various embodiments and use e.g. protruding portions, separate elements, openings in the cover element, decorative foils, etc. all in one single assembly, if that should be necessary or desired. For example, the shown arrangement of a rear mounted module 40i with protrusions 44 shown in FIG. 4 can be realized on some portions of the cover element, while on other portions of the same cover element the solution of FIG. 3 is realized, etc.

REFERENCE SIGNS 1 electronic module (prior art)
2 transparent cover
3 housing
4 PCB
5 LED
10, 10', 10", 10''' airbag cover assembly
11 mounting means
20, 40, 50, 60 electronic module
20i, 40i, 50i, 60i integrated electronic module
21, 41, 51, 61 plastic material
22, 42, 52, 62 (flexible) substrate
23, 43, 53, 63 LED
24 decorative foil
25 electrical conducts
26, 46, 56 mounting means
30 cover element
31 opening
32 mounting apertures
47, 57, 67 light reflecting structure
59 separate component
64 decorative textile
65 non-transparent portions

The invention claimed is:

1. A vehicle airbag cover assembly, comprising:
a cover element and
an electronic module comprising a light emitting element, which module is embedded in a at least partially transparent plastic material thus forming an integrated electronic module, whereby the integrated module is arranged at the cover element such that an illumination from the at least one light emitting element is visible for a passenger when the airbag cover assembly is installed in a vehicle
wherein the plastic material is injection molded over the electronic module, the plastic material forms a part of the surface of the cover element, and the plastic material comprises an integrally formed mounting means for mounting at the cover element.

2. The vehicle airbag cover assembly according to claim 1, wherein the airbag cover element is provided with at least partially transparent portions and/or openings and the integrated module is arranged on the rearside of the airbag cover element at least partially covering the transparent portions and/or openings.

3. The vehicle airbag cover assembly according to claim 1, wherein the integrated electronic module is configured to illuminate a logo of the vehicle brand.

4. The vehicle airbag cover assembly according to claim 3, wherein the logo is integrated with the cover element, and/or wherein the logo is integrated with the integrated electronic module, and/or wherein the logo is provided in form of a separate component that is attached to the front surface of the cover element.

5. The vehicle airbag cover assembly according to claim 1, wherein the integrated electronic module comprises a flexible substrate carrying the light emitting element and the surface of the embedding plastic material is at least partially covered with paint, a foil or textile, which comprises transparent portions and essentially non-transparent portions.

6. The vehicle airbag cover assembly according to claim 5, wherein the non-transparent portions are printed onto the foil.

7. The vehicle airbag cover assembly according to claim 5, wherein the flexible substrate comprises light reflecting structures separate from the light emitting element(s) configured to direct light emitted from the light emitting element(s) essentially perpendicular to the plane of the substrate.

8. The vehicle airbag cover assembly according to claim 1, wherein the integrated electronic module comprises a flexible substrate carrying the light emitting element and the embedding plastic material comprises at its surface protruding portions that extend at least partially through openings in the cover element.

9. The vehicle airbag cover assembly according to claim 1, wherein at least some of the light emitting elements(s) are arranged to emit light essentially parallel to the plane of the substrate.

10. The vehicle airbag cover assembly according to claim 1, wherein the cover element comprises at least one predetermined breaking point allowing a rupturing of the cover element upon deployment of the airbag.

11. The vehicle airbag cover assembly according to claim 1, wherein the cover assembly is a driver airbag cover assembly.

12. The vehicle airbag cover assembly according to claim 1, wherein the plastic material is injection-molded onto the electronic module and/or wherein the plastic material is chosen from the group of: thermoplastic materials in general, silicon, thermoplastic elastomers, polymers, polyethylenes, polystyrene, PMMA (Polymethylmethacrylate), Polycarbonate (PC), polyimide, rubber or rubbery material.

13. The vehicle airbag cover assembly according to claim 1, wherein the integrated electronic module has an essentially flat configuration with a thickness of 2 to 10 mm.

14. The vehicle, in particular passenger vehicle, comprising an airbag cover assembly according to claim 1.

15. The vehicle airbag cover assembly according to claim 1, wherein the integrated module has an essentially flat configuration with a thickness of 2 to 8 mm.

16. The vehicle airbag cover assembly according to claim 1, wherein the integrated module has an essentially flat configuration with a thickness of 2 to 7 mm.

17. The vehicle airbag cover assembly according to claim 1, wherein the integrated module has an essentially flat configuration with a thickness of 2 to 5 mm.

* * * * *